United States Patent
Howard et al.

(10) Patent No.: US 9,742,977 B2
(45) Date of Patent: Aug. 22, 2017

(54) CAMERA REMOTE CONTROL

(71) Applicant: Apple Inc., Cupertino, CA (US)

(72) Inventors: James A. Howard, Mountain View, CA (US); Eric S. Lee, Mountain View, CA (US); Hugh W. Johnson, Orinda, CA (US); James C. Dovey, Cupertino, CA (US); Gregory R. Chapman, San Jose, CA (US); James D. Batson, Sunnyvale, CA (US); George E. Williams, Pleasanton, CA (US); Walker J. Eagleston, San Francisco, CA (US); Gregory B. Novick, San Francisco, CA (US); Chanaka G. Karunamuni, San Jose, CA (US)

(73) Assignee: Apple Inc., Cupertino, CA (US)

( * ) Notice: Subject to any disclaimer, the term of this patent is extended or adjusted under 35 U.S.C. 154(b) by 79 days.

(21) Appl. No.: 14/842,597

(22) Filed: Sep. 1, 2015

(65) Prior Publication Data
US 2016/0065831 A1 Mar. 3, 2016

Related U.S. Application Data

(60) Provisional application No. 62/044,938, filed on Sep. 2, 2014.

(51) Int. Cl.
*H04N 5/232* (2006.01)

(52) U.S. Cl.
CPC ..... *H04N 5/23206* (2013.01); *H04N 5/23203* (2013.01); *H04N 5/23293* (2013.01); *H04N 2201/0075* (2013.01)

(58) Field of Classification Search
CPC .......... H04N 5/23293; H04N 5/23216; H04N 5/23206; H04N 5/23203; H04N 5/232;
(Continued)

(56) References Cited

U.S. PATENT DOCUMENTS

| | | | | |
|---|---|---|---|---|
| 6,359,837 B1 * | 3/2002 | Tsukamoto | ............ | G03B 17/24 368/10 |
| 6,429,896 B1 * | 8/2002 | Aruga | ..................... | H04N 5/77 348/231.99 |

(Continued)

OTHER PUBLICATIONS

Galbraith, Rob "Review: blueSLR remote trigger and geolocation system for Nikon", Published on Thursday, Jan. 27, 2011; accessed on Aug. 13, 2014; 7 pages, http://www.robgalbraith.com/content_pagef389.html?cid=7-1113.

*Primary Examiner* — Michael Osinski
(74) *Attorney, Agent, or Firm* — Kilpatrick Townsend & Stockton LLP

(57) ABSTRACT

Certain embodiments of the present invention provide the ability to control a camera from a wearable mechanism device, such as a watch, pendant or other device with its own limited display. Certain embodiments of the present invention provide a wearable mechanism device for remotely controlling a camera with an intuitive user interface and sequencing of interface options. In one embodiment, the display on the wearable mechanism changes before a picture or video is taken with the electronic camera. Certain embodiments of the present invention provide the ability to partially control a camera from the wearable mechanism device, providing split control.

21 Claims, 12 Drawing Sheets

(58) Field of Classification Search
CPC ....... H04N 5/44582; H04N 2201/0055; H04N 2201/0084; H04N 2201/0075; H04N 2201/0074; H04N 2201/0049; H04M 2250/52; G06F 1/163; G06F 3/0416
See application file for complete search history.

(56) References Cited

U.S. PATENT DOCUMENTS

| | | | |
|---|---|---|---|
| 6,809,759 B1* | 10/2004 | Chiang | H04N 5/23293 348/211.2 |
| 7,130,664 B1 | 10/2006 | Williams | |
| 7,643,168 B2 | 1/2010 | Monroe | |
| 8,675,084 B2 | 3/2014 | Bolton et al. | |
| 9,113,072 B2* | 8/2015 | Kinoshita | H04N 5/23206 |
| 9,451,144 B2* | 9/2016 | Dye | H04N 5/23206 |
| 9,578,185 B2* | 2/2017 | Jung | H04N 1/00106 |
| 2006/0158544 A1* | 7/2006 | Nakajima | H04N 1/2112 348/333.01 |
| 2006/0282551 A1* | 12/2006 | Steinberg | G06F 1/1632 710/8 |
| 2007/0025711 A1* | 2/2007 | Marcus | G03B 17/38 396/56 |
| 2007/0064113 A1* | 3/2007 | Lee | H04N 1/00127 348/207.99 |
| 2007/0109417 A1 | 5/2007 | Hyttfors et al. | |
| 2007/0254640 A1 | 11/2007 | Bliss | |
| 2007/0286587 A1 | 12/2007 | Hwang | |
| 2010/0220196 A1* | 9/2010 | Sumioka | H04N 5/23293 348/207.1 |
| 2010/0225758 A1 | 9/2010 | Mashlah | |
| 2010/0289910 A1 | 11/2010 | Kamshilin | |
| 2011/0058052 A1* | 3/2011 | Bolton | H04M 1/7253 348/211.99 |
| 2011/0115932 A1* | 5/2011 | Shin | H04N 5/232 348/211.4 |
| 2012/0014684 A1* | 1/2012 | D'Souza | H04N 5/23216 396/263 |
| 2012/0040719 A1* | 2/2012 | Lee | G06F 1/1626 455/557 |
| 2012/0081207 A1 | 4/2012 | Toprani et al. | |
| 2013/0093904 A1* | 4/2013 | Wagner | H04N 5/23203 348/207.11 |
| 2013/0235222 A1 | 9/2013 | Karn et al. | |
| 2013/0235226 A1* | 9/2013 | Karn | H04N 5/23241 348/220.1 |
| 2014/0078371 A1* | 3/2014 | Kinoshita | H04N 5/23206 348/333.02 |
| 2015/0215443 A1* | 7/2015 | Heo | H04M 1/0202 455/556.1 |
| 2016/0065758 A1* | 3/2016 | Kang | H04N 1/00503 358/1.15 |
| 2016/0119464 A1* | 4/2016 | Kim | G06F 3/0482 455/566 |
| 2016/0344918 A1* | 11/2016 | Tao | H04N 5/23293 |
| 2016/0381534 A1* | 12/2016 | Kwon | H04W 4/18 455/556.1 |
| 2017/0048428 A1* | 2/2017 | Morisawa | H04N 5/2252 |
| 2017/0064128 A1* | 3/2017 | Takeuchi | H04N 1/2145 |

* cited by examiner

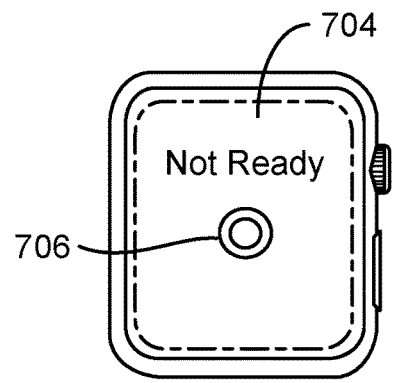
FIG. 7
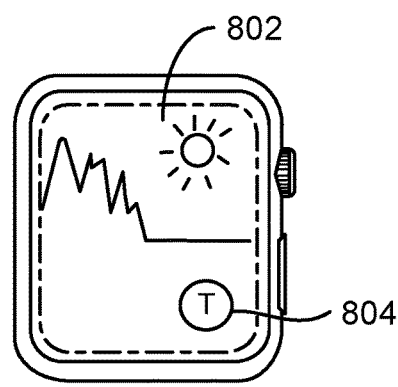
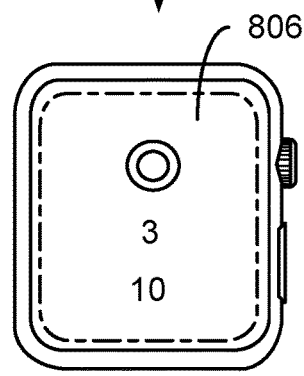
FIG. 8

CAMERA REMOTE CONTROL

CROSS-REFERENCES TO RELATED APPLICATIONS

This application claims the benefit of U.S. Provisional Application Ser. No. 62/044,938 filed Sep. 2, 2014 entitled "Camera Remote Control" by James A. Howard, Eric S. Lee, Hugh W. Johnson, James C. Dovey, Gregory R. Chapman, James D. Batson, George E. Williams, Walker J. Eagleston, Gregory B. Novick, and Chanaka G. Karunamuni. The disclosure of the 62/044,938 application is hereby incorporated by reference in its entirety for all purposes.

BACKGROUND OF THE INVENTION

The following portion of this disclosure presents a simplified summary of one or more innovations, embodiments, and/or examples found within this disclosure for at least the purpose of providing a basic understanding of the subject matter. This summary does not attempt to provide an extensive overview of any particular embodiment or example. Additionally, this summary is not intended to identify key/critical elements of an embodiment or example or to delineate the scope of the subject matter of this disclosure. Accordingly, this summary presents some innovations, embodiments, and/or examples found within this disclosure in a simplified form as a prelude to a more detailed description presented later.

Certain embodiments of the present invention provide the ability to control a camera from a wearable mechanism, such as a watch, pendant or other device with its own limited display. The camera can be in an electronic device, such as a cell phone, smart phone, web cam, dedicated camera, a tablet computing device; a portable media player; a laptop/notebook computer, personal digital assistant, touch screen, input-sensitive pad or surface or any other portable or non-portable device.

For situations where the wearable mechanism is in the picture, the display on the wearable mechanism changes before a picture or video is taken with the camera, to control the appearance of the wearable mechanism in the photo or video. For example, the display can change from a remote control display to a blank display, the display of a watch face, a decorative display or other display.

Certain embodiments of the present invention provide a wearable mechanism for remotely controlling a camera with an intuitive user interface and sequencing of interface options. In one embodiment, a camera application is launched on an electronic device upon selection of a camera icon on a wearable mechanism display. If successful, the wearable mechanism display provides a preview screen and a shutter button, as well as an icon for activating a timer. Various successive displays, depending on user selection, are intuitive and provide an easy return to a home screen.

Certain embodiments of the present invention provide the ability to partially control a camera from a wearable mechanism device, such as a watch, pendant or other device with its own limited display. In one embodiment, at least one user input-output (I/O) function is performed on the camera itself, while another user input-output function is performed on the wearable mechanism device. User I/O functions include any input provided by a user, and any output provided to the user. For example, inputs include the user activating any button or soft key on a display, or any audio or gesture input. Outputs include visual displays, audio, haptic and any other feedback or output to the user. In one embodiment, the user can look at the preview on the display of the wearable mechanism device using one arm, while moving the camera held in the hand of the other arm. The hand holding the camera can also optionally activate the shutter button on the camera, eliminating the need to do this on the wearable mechanism.

To better understand the nature and advantages of various embodiments of the present invention, reference should be made to the following description and the accompanying figures. It is to be understood, however, that each of the figures is provided for the purpose of illustration only and is not intended as a definition of the limits of the scope of the present invention.

BRIEF DESCRIPTION OF THE DRAWINGS

FIG. 7 is a diagram illustrating a wearable mechanism device screen for an unsupported action according to an embodiment of the present invention.

FIG. 8 is a diagram illustrating a wearable mechanism device screen for activating a timer according to an alternate embodiment of the present invention.

DETAILED DESCRIPTION OF THE INVENTION

Some embodiments of the present invention relate a wearable device having a user interface that allows it to interact with other electronic devices during image capture using a camera in the electronic device. The wearable device or mechanism can be any electronic mechanism, such as a watch, pendant or other device which can be worn and has its own display. The camera can be in any electronic device, such as a cell phone, smart phone, web cam, dedicated camera, or any other portable or non-portable device.

Figure 1:
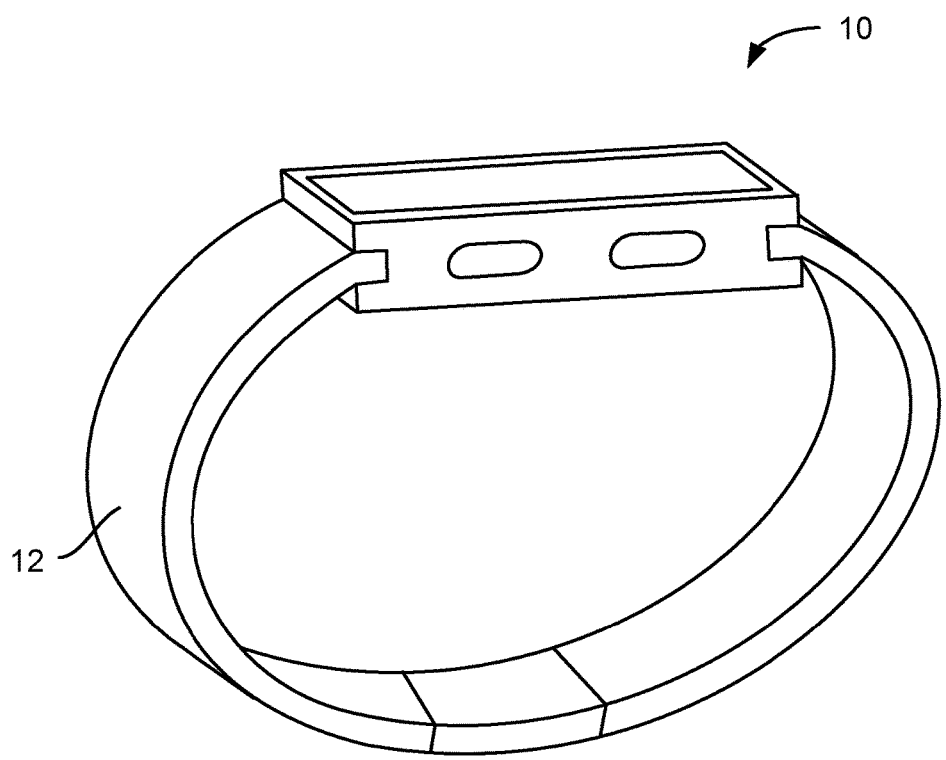
FIG. 1 is a diagram of a perspective view of a wearable mechanism according to one embodiment of the present invention.

Embodiments described herein may take the form of, be incorporated in, or operate with a suitable electronic device. One example of such a device is shown in FIG. 1 and takes the form of a wearable electronic mechanism 10. As shown, mechanism 10 may be worn on a user's wrist and secured thereto by a band 12. Mechanism 10 may have a variety of functions including, but not limited to: keeping time; monitoring a user's physiological signals and providing health-related information based on those signals; communicating (in a wired or wireless fashion) with other electronic devices, which may be different types of devices having different functionalities; providing alerts to a user, which may include audio, haptic, visual and/or other sensory output, any or all of which may be synchronized with one another; visually depicting data on a display; gather data form one or more sensors that may be used to initiate, control, or modify operations of the device; determine a location of a touch on a surface of the device and/or an amount of force exerted on the device, and use either or both as input; accepting voice input to control one or more functions; accepting tactile input to control one or more functions; and so on.

Alternative embodiments of suitable electronic devices include a phone; a tablet computing device; a portable media player; and so on. Still other suitable electronic devices may include laptop/notebook computers, personal digital assistants, touch screens, input-sensitive pads or surfaces, and so on.

Figure 2:
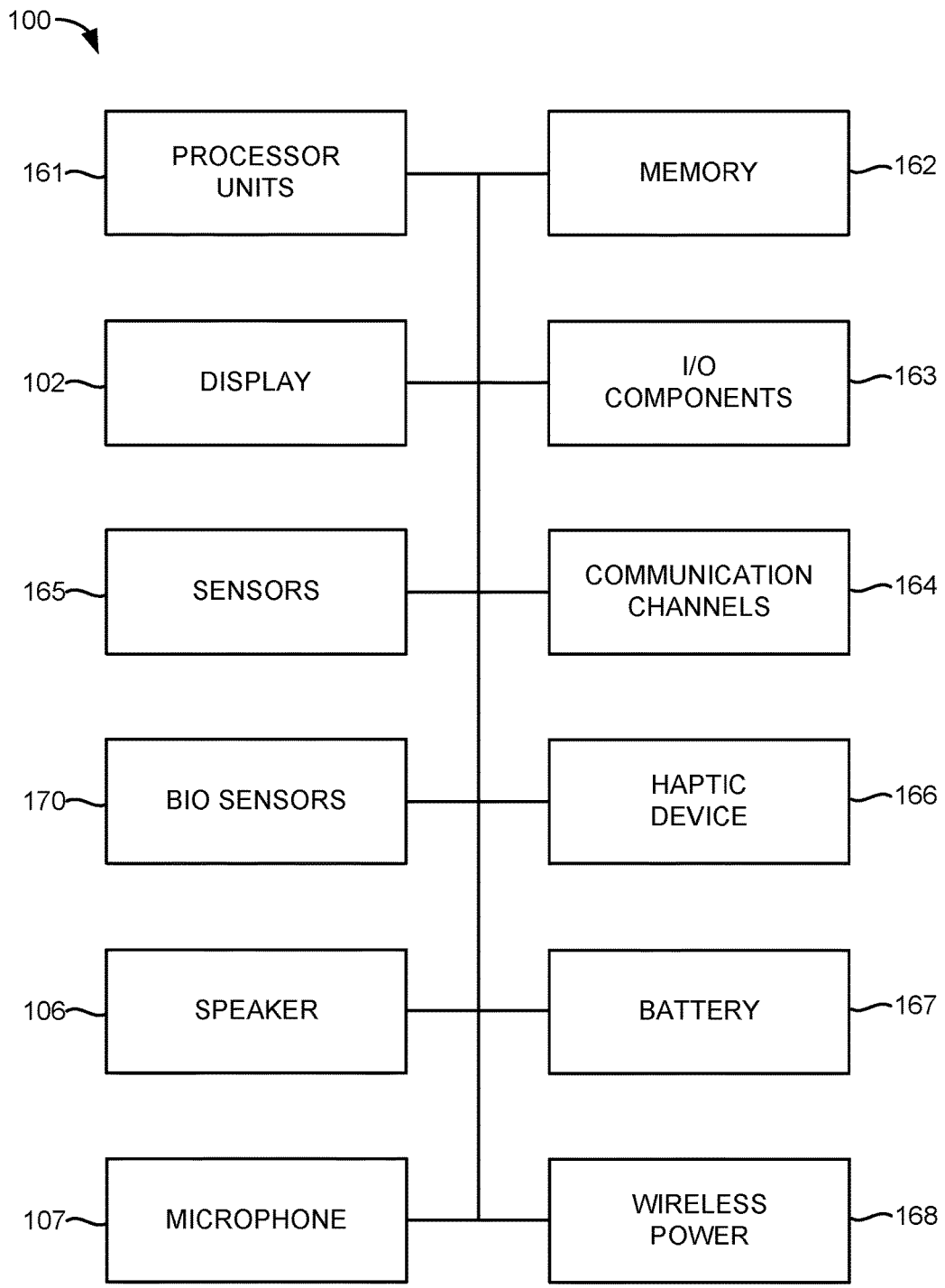
FIG. 2 is a diagram of an example schematic diagram of a wearable mechanism.

FIG. 2 depicts an example schematic diagram of a wearable electronic device 100, which in some instances can be mechanism 10 shown in FIG. 1. As shown in FIG. 2, the device 100 includes one or more processing units 161 that are configured to access a memory 162 having instructions stored thereon. The instructions or computer programs may be configured to perform one or more of the operations or functions described with respect to the device 100. For example, the instructions may be configured to control or coordinate the operation of the various components of the device. Such components include, but are not limited to, display 102, one or more input/output components 163, one or more communication channels 164, one or more sensors 165, a speaker 106, microphone 107, and/or one or more haptic feedback devices 166. In some embodiments the speaker and microphone may be combined into a single unit and/or may share a common port through a housing of the device.

The processing units 116 of FIG. 2 may be implemented as any electronic device capable of processing, receiving, or transmitting data or instructions. For example, the processing units 116 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

In some embodiments the electronic device may accept a variety of bands, straps, or other retention mechanisms (collectively, "bands"). These bands may be removably connected to the electronic device by a lug that is accepted in a recess or other aperture within the device and locks thereto. The lug may be part of the band or may be separable (and/or separate) from the band. Generally, the lug may lock into the electronic device's recess and thereby maintain connection between the band and device. The user may release a locking mechanism to permit the lug to slide or otherwise move out of the recess. In some embodiments, the recess may be formed in the band and the lug may be affixed or incorporated into the device.

A user may change combinations of bands and electronic devices, thereby permitting mixing and matching of the two categories. It should be appreciated that devices having other forms and/or functions may include similar recesses and may releasably mate with a lug and/or band incorporating a lug. In this fashion, an ecosystem of bands and devices may be envisioned, each of which is compatible with another. A single band may be used to connect to devices, as one further example; in such embodiments the band may include electrical interconnections that permit the two devices to transmit signals to one another and thereby interact with one another.

In many embodiments, the electronic device may keep and display time, essentially functioning as a wristwatch among other things. Time may be displayed in an analog or digital format, depending on the device, its settings, and (in some cases) a user's preferences. Typically, time is displayed on a digital display stack forming part of the exterior of the device.

The display stack may include a cover element, such as a cover glass, overlying a display. The cover glass need not necessarily be formed from glass, although that is an option; it may be formed from sapphire, zirconia, alumina, chemically strengthened glass, hardened plastic and so on. Likewise, the display may be a liquid crystal display, an organic light-emitting diode display, or any other suitable display technology. Among other elements, the display stack may include a backlight in some embodiments.

The device also may comprise one or more touch sensors to determine a location of a touch on the cover glass. A touch sensor may be incorporated into or on the display stack in order to determine a location of a touch. The touch sensor may be self-capacitive in certain embodiments, mutual-capacitive in others, or a combination thereof.

Similarly, the device may include a force sensor to determine an amount of force applied to the cover glass. The force sensor may be a capacitive sensor in some embodiments and a strain sensor in other embodiments. In either embodiment, the force sensor is generally transparent and made form transparent materials, or is located beneath or away from the display in order not to interfere with the view of the display. The force sensor may, for example, take the form of two capacitive plates separated by silicone or another deformable material. As the capacitive plates move closer together under an external force, the change in capacitance may be measured and a value of the external force correlated from the capacitance change. Further, by comparing relative capacitance changes from multiple points on the force sensor, or from multiple force sensors, a location or locations at which force is exerted may be determined. In one embodiment the force sensor may take the form of a gasket extending beneath the periphery of the display. The gasket may be segmented or unitary, depending on the embodiment.

The electronic device may also provide alerts to a user. An alert may be generated in response to: a change in status of the device (one example of which is power running low); receipt of information by the device (such as receiving a message); communications between the device and another mechanism/device (such as a second type of device informing the device that a message is waiting or communication is in progress); an operational state of an application (such as, as part of a game, or when a calendar appointment is imminent) or the operating system (such as when the device powers on or shuts down); and so on. The number and types of triggers for an alert are various and far-ranging.

The alert may be auditory, visual, haptic, or a combination thereof. A haptic actuator may be housed within the device and may move linearly to generate haptic output (although in alternative embodiments the haptic actuator may be rotary or any other type). A speaker may provide auditory components of an alert and the aforementioned display may provide visual alert components. In some embodiments a dedicated light, display, or other visual output component may be used as part of an alert.

The auditory, haptic and/or visual components of the alert may be synchronized to provide an overall experience to a user. One or more components may be delayed relative to other components to create a desired synchronization between them. The components may be synchronized so that they are perceived substantially simultaneously; as one example, a haptic output may be initiated slightly before an auditory output since the haptic output may take longer to be perceived than the audio. As another example, a haptic output (or portion thereof) may be initiated substantially before the auditory output but at a weak or even subliminal level, thereby priming the wearer to receive the auditory output.

Figure 3:
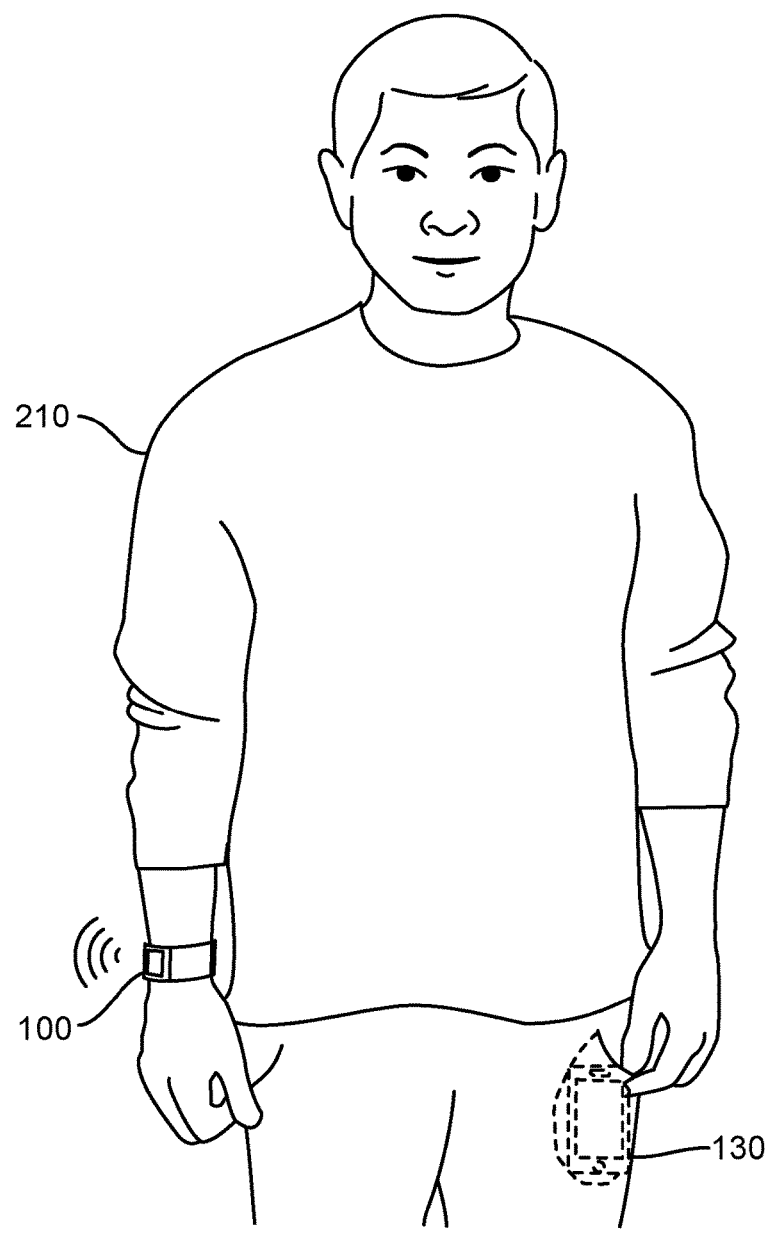
FIG. 3 is a diagram of an embodiment of a user wearing a wearable mechanism with a second electronic device in his pocket.

The example electronic device may communicate with other electronic devices either through a wired connection or wirelessly. Data may be passed between devices, permitting one device to relay information to another; control another; employ another's sensors, outputs, and/or inputs; and so on. FIG. 3 depicts a user 210 wearing a sample electronic device 100 with a second electronic device 130 in his pocket. Data may be wirelessly transmitted between the electronic devices 100, 130, thereby permitting the user 210 to receive, view, and interact with data from the second device 130 by means of the first electronic device 100. Thus, the user 210 may have access to part or all of the second device's functionality through the first electronic device 100 without actually needing to interact directly with the second device.

Further, the electronic devices 100, 130 may cooperate not only to share data but to share functionality as well. For example, one of the two devices may incorporate a sensor, application, or function that the other lacks. The electronic device lacking such capabilities may request them from the other device, which may share wirelessly with the requesting device. Thus, multiple devices may operate together to provide expanded functions, software, access and the like between the two and ultimately to a user. As one non-limiting example, the electronic device 100 may be unable to place or receive telephone calls while the second device 130 may be able to do so. A user may nonetheless make and/or receive calls through the first device 100, which may employ the second device 130 to actually place or accept a call.

As another non-limiting example, an electronic device 100 may wirelessly communicate with a sales terminal nearby, thus permitting a user to quickly and efficiently conduct a transaction such as selling, buying, or returning a good. The electronic device may use near field communications technology to perform these and other functions.

As mentioned above, a band may be connected to two electronic devices and may serve as a wired communication path between the two. As another example, the devices may communicate wirelessly, thereby permitting one device to relay information from a second to a user. This latter example may be particularly useful when the second is inaccessible.

Certain embodiments may incorporate one or more biometric sensors to measure certain physiological characteristics of a user. The device may include a photoplesymogram sensor to determine a user's heart rate or blood oxygenation levels, for example. The device may also or instead include electrodes to measure the body impedance of a user, which may permit the device to estimate body fat percentages, the body's electrical activity, body impedance, and so on. Also include blood pressure, ultraviolet exposure, etc. Depending on the sensors incorporated into or associated with the electronic device, a variety of user characteristics may be measured and/or estimated, thereby permitting different health information to be provided to a user.

Certain embodiments may be wirelessly charged. For example, an inductive charging base may transmit power to an inductive receiver within the device in order to charge a battery of the device. Further, by varying the inductive field between the device and base, data may be communicated between the two. As one simple non-limiting example, this may be used to wake the base from a low-power sleep state to an active charging state when the device is placed on the base. Other wireless charging systems also may be used (e.g., near field magnetic resonance and radio frequency). Alternatively, the device also may employ wired charging through electrodes.

In certain embodiments, the device may include a rotary input, which may take the form of a crown with a stem. The crown and stem may be rotated to provide the rotary input. Rotation of the stem and/or crown may be sensed optically, electrically, magnetically, or mechanically. Further, in some embodiments the crown and stem may also move laterally, thereby providing a second type of input to the device.

The electronic device may likewise include one or more buttons. The button(s) may be depressed to provide yet another input to the device. In various embodiments, the button may be a dome switch, rocker switch, electrical contact, magnetic switch, and so on. In some embodiments the button may be waterproof or otherwise sealed against the environment.

Various embodiments may include or otherwise incorporate one or more motion sensors. A motion sensor may detect motion of the device and provide, modify, cease, or otherwise affect a state, output, or input of the device or associated applications based on the motion. As non-limiting examples, a motion may be used to silence the device or acknowledge an alert generated by the device. Sample motion sensors include accelerometers, gyroscopic sensors, magnetometers, GPS sensors, distance sensors, and so on. Some embodiments may use a GPS sensor to facilitate or enable location and/or navigation assistance.

As shown in FIG. 2, the device 100 may also include one or more acoustic elements, including a speaker 106 and/or a microphone 107. The speaker 106 may include drive electronics or circuitry and may be configured to produce an audible sound or acoustic signal in response to a command or input. Similarly, the microphone 107 may also include drive electronics or circuitry and is configured to receive an audible sound or acoustic signal in response to a command or input. The speaker 106 and the microphone 107 may be acoustically coupled to port or opening in the case that allows acoustic energy to pass, but may prevent the ingress of liquid and other debris.

Certain embodiments may incorporate an ambient light sensor. The ambient light sensor may permit the device to sense a brightness of its environment and adjust certain operational parameters accordingly. For example, the electronic device may modify a brightness of a display in response to the sensed ambient light. As another example, the electronic device may turn the display off if little or no light is sensed for a period of time.

These and other functions, operations, and abilities of the electronic device will be apparent upon reading the specification in its entirety.

Split I/O Functions Between Wearable Mechanism and Electronic Device

Figure 4:
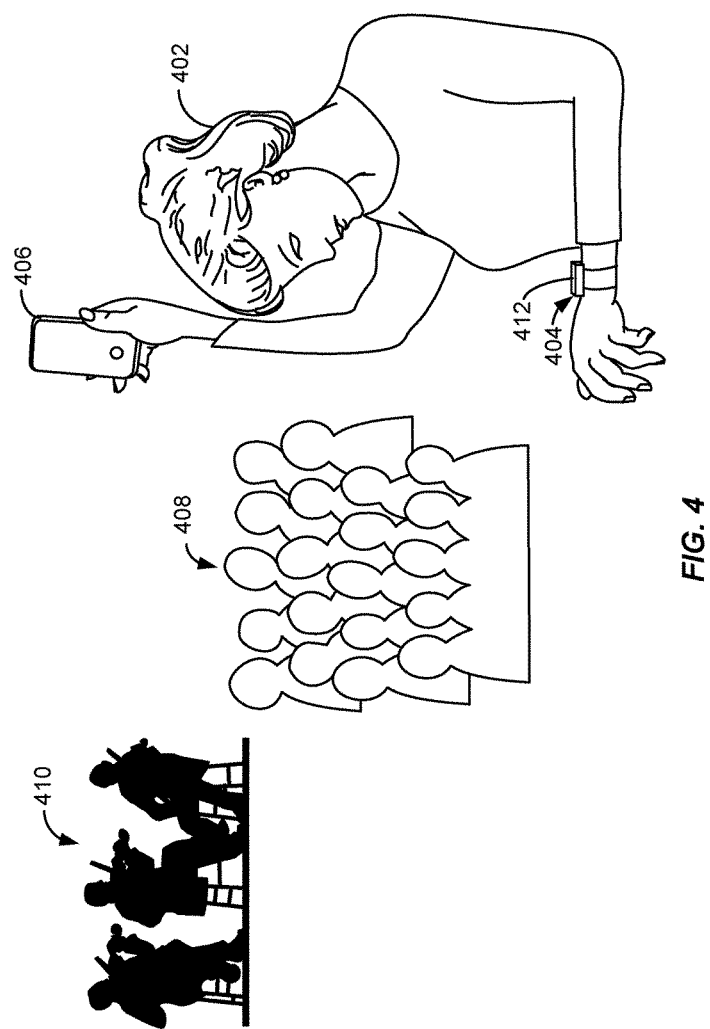
FIG. 4 is a diagram illustrating methods of using a wearable mechanism according to various embodiments of the present invention.

FIG. 4 is a diagram illustrating certain methods of using a wearable mechanism with an electronic device according to certain embodiments of the present invention. A user 402 is wearing wearable mechanism 404 attached to their wrist. User 402 is also holding an electronic device 406. In this example electronic device 406 is a portable device such as a cell phone or smart phone including a camera. User 402 is able to hold portable device 406 high above a crowd 408 at a concert for a musical group 410. Using smart phone 406 directly can be problematic because of the need to be able to see the preview screen on smart phone 406, which requires holding it at an angle or not as high as desired, as well as being awkward. Using embodiments of the present invention, user 402 can look at a camera preview transmitted/streamed in real-time from smart phone 406 to wearable mechanism 404 and displayed on a display 412 of wearable mechanism 404.

In addition to providing the preview or viewing function between the camera of an electronic device and a wearable mechanism, the present invention also allows divided I/O control. In one embodiment, user 402 can view the preview on screen 412 and move smart phone 406 with her other hand to get the desired view. Once the desired view is achieved, user 402 can use her right hand to press the shutter button on smart phone 406 while still being able to look at the preview on screen 412 of wearable mechanism 404.

Figure 12:
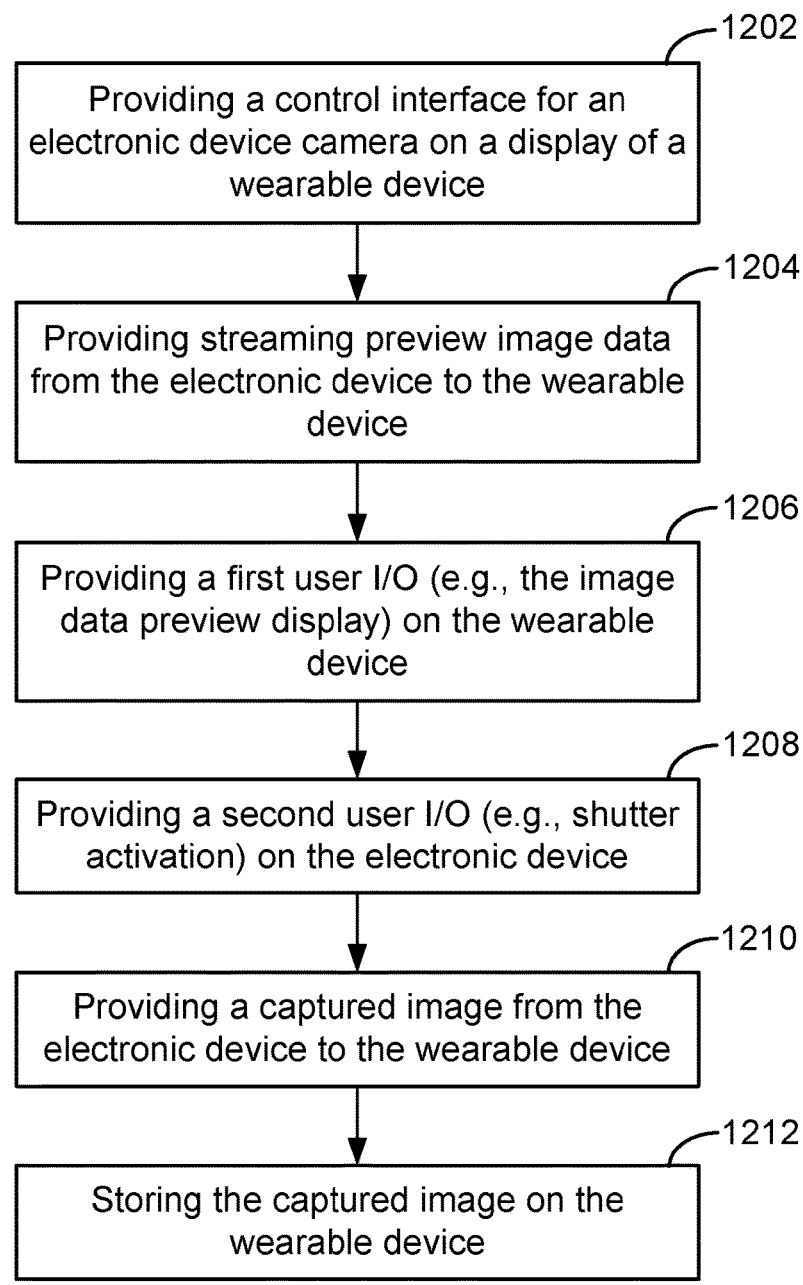
FIG. 12 is a flow chart illustrating a method for splitting user input-outputs between a wearable mechanism and an electronic device according to one embodiment of the present invention.

FIG. 12 is a flow chart illustrating one embodiment of this method. A control interface for an electronic device camera is provided on a display of a wearable device (1202). A streaming preview is provided from the electronic device to the wearable device (1204). A first user I/O, such as providing the image preview display, is provided on the wearable device (1206). A second user I/O, such as activating the shutter button, is provided on the electronic device (1208). At least one captured image from the camera of the electronic device is provided to the wearable device (1210) and is stored on the wearable device (1212).

Display Screen Sequencing

Figure 5:
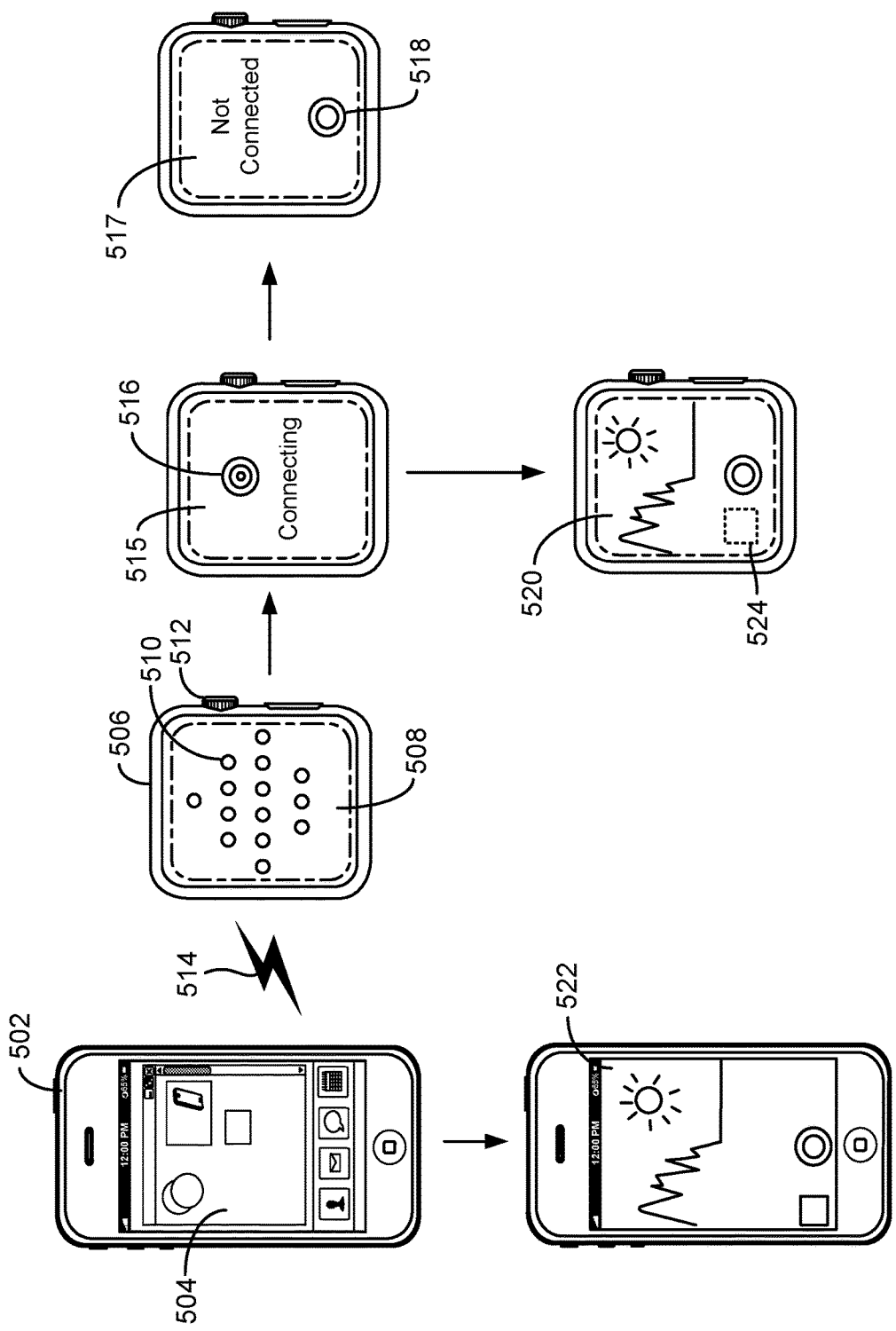
FIG. 5 is a diagram illustrating wearable mechanism and electronic device screens during a connection operation according to various embodiments of the present invention.
Figure 13:
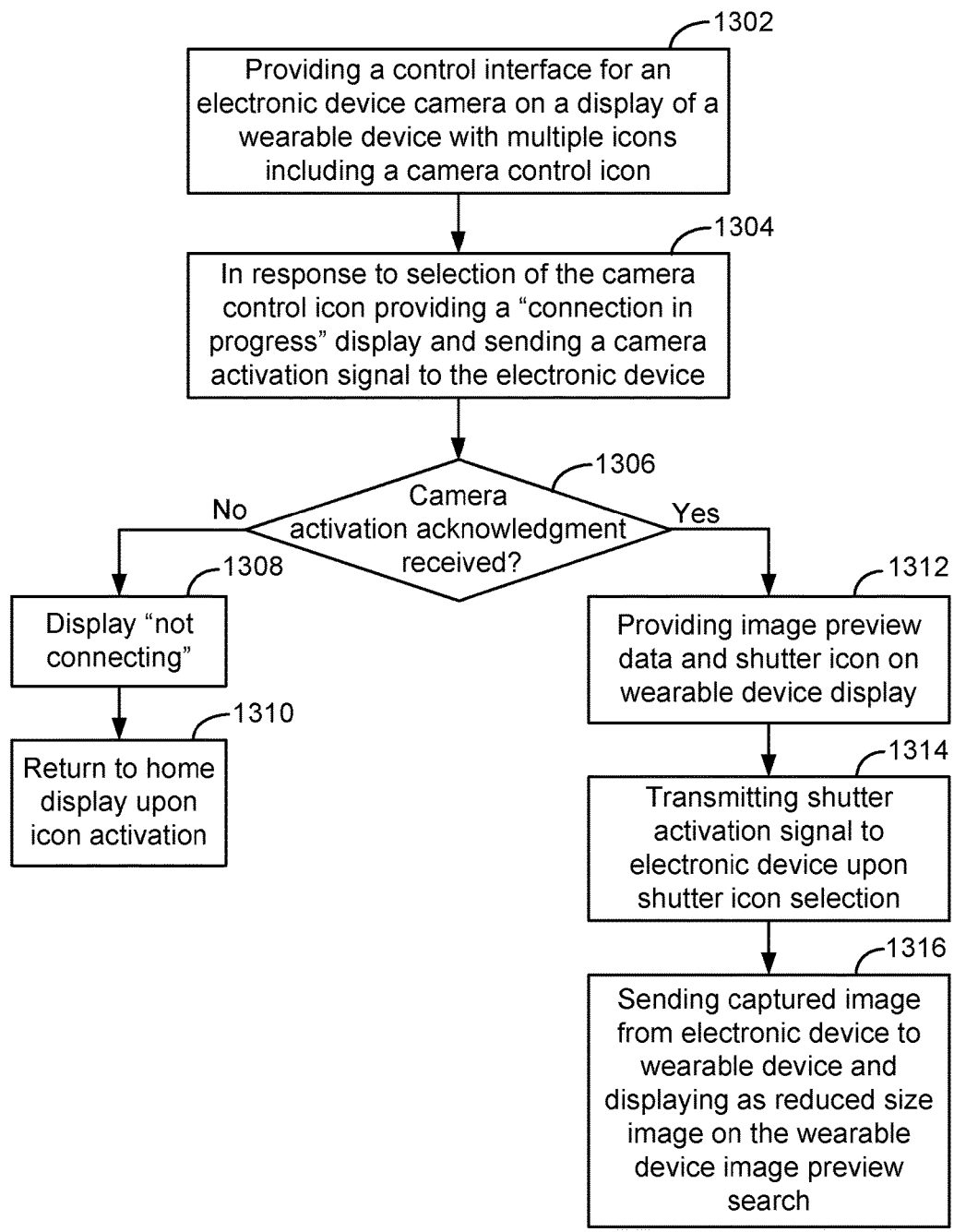
FIG. 13 is a flow chart illustrating a method for a series of screen transitions during and following a connection process between a wearable mechanism and an electronic device.

An intuitive sequencing of simplified displays enhances the user experience. FIG. 5 is a diagram illustrating wearable mechanism and electronic device screens during a connection operation according to various embodiments of the present invention. FIG. 13 is a flow chart showing illustrating one embodiment of this method. An electronic device 502 is shown with the display screen 504. A wearable mechanism 506 includes a display 508. A home display shows a group or carousel of icons, including a camera icon 510 (see FIG. 13, 1302). A user can select camera icon 510 by touching it on display 508, or alternately scrolling through the icons using a crown or dial 512. The selection of camera icon 510 initiates communication with electronic device 502 via a wireless link 514 (see FIG. 13, 1304).

Electronic device 502 will have been previously paired with wearable mechanism 506. Such a pairing or handshake operation checks to determine that both electronic device and wearable mechanism are registered to the same user, as described in more detail below. The selection of the camera icon 510 causes a communication control signal to be sent to electronic device 502 to initiate the camera application, regardless of the mode in which electronic device 502 is currently in. In particular, where electronic device 502 is a smart phone, such as an iPhone® mobile digital device from Apple Computer, the camera application can be brought up regardless of whether the smart phone is in the SpringBoard mode (dashboard), another application, or the lock screen. During this connection operation, wearable mechanism 506 displays a connecting screen 515 with a changing icon 516 to indicate a connection in process (FIG. 13, 1304). The icon can take the form of a rotating ring, a brightening and dimming light, or any other movement or change.

If a connection is not made within a timeout period (FIG. 13, 1306), an indication of "no connection" screen 517 is displayed, including a shutter button display icon 518 (FIG. 13, 1308). A failure to connect can occur for any number of reasons, such as the device being out of range, or being powered off, etc. Pressing button 512 returns the display to the original carousel of icons display 508 (FIG. 13, 1310).

If a connection is made (FIG. 13, 1306), a display 520 is provided which corresponds to a preview display 522 on electronic device 502 from a camera view upon activation of the application (FIG. 13, 1312). Display 520 is a smaller form factor version of display 522. Also, for optimizing due to bandwidth limitations of the wireless connection, display 520 is a video at the resolution of the wearable mechanism preview display and may, for example, be running at a maximum of 30 frames per second. This can be less than the resolution of the video of display 522 of electronic device 502, and may be a lower frame rate, but is sufficient for a preview mode on a smaller display.

In one embodiment, the user selects a mode in the camera application on the electronic device (e.g., photo, video, etc.). The use can also select the front or back camera mode on the electronic device. The designation of such controls on the electronic device allows a simplified and more intuitive interface on the wearable mechanism. However, alternately, the modes can be controlled from the wearable mechanism via any type of input (touch, voice command, etc.).

If the electronic preview screen is rotated, the wearable mechanism preview display will similarly rotate. In various embodiments, the rotation can be trigged by the display of the electronic device rotating, or by the housing of the electronic device being rotated, regardless of the orientation of the electronic device preview display.

Once the picture has been taken (FIG. 13, 1314), the display returns to the preview mode shown in display 520, which includes a photo icon 524 for the photo just taken (FIG. 13, 1316). Selecting icon 524 can pull up the photo or video for review, and also allow for review of previous photos and videos. The camera in the electronic device stores the photo/video, and also sends a reduced size, compressed version to the wearable mechanism.

Various other control functions can be provided. For example, the crown input or another input can be used to un-launch the camera application. Also, upon closing the camera function on the wearable mechanism, such as by returning to the home screen, the camera application on the electronic device can also be closed. In one embodiment, the electronic device is a camera, not a smart phone or tablet, in which case it is not closed or turned off unless the user affirmatively selects that function on the wearable mechanism or the camera.

Timer Operation Screens

Figure 6:
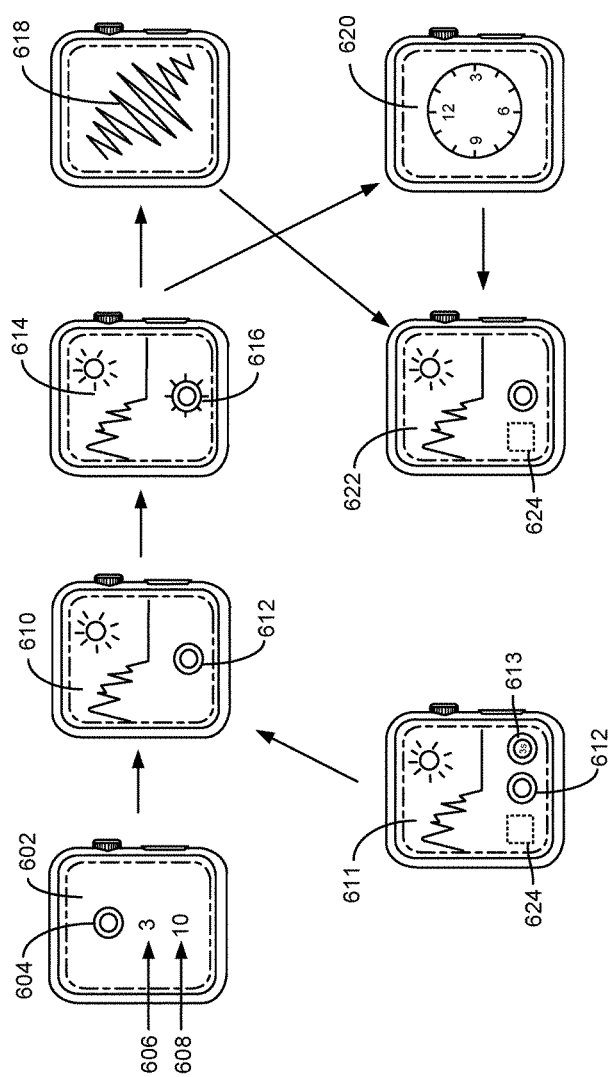
FIG. 6 is a diagram illustrating wearable mechanism device screens during a timer operation according to various embodiments of the present invention.
Figure 11:
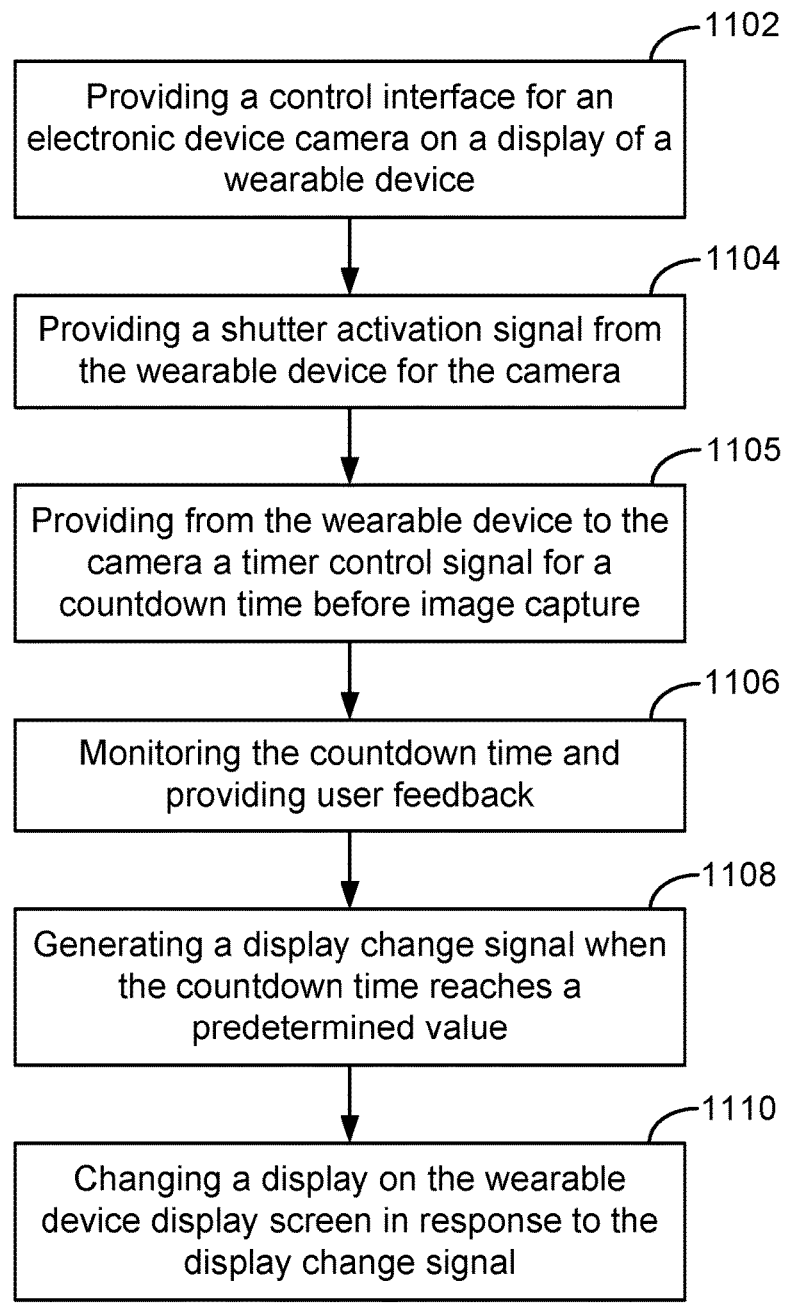
FIG. 11 is a flow chart illustrating a method for changing a wearable device display during a timer countdown according to one embodiment of the present invention.

FIG. 6 is a diagram illustrating wearable mechanism device screens during a timer operation according to various embodiments of the present invention. FIG. 11 is a flow chart illustrating this method according to one embodiment of the present invention. A display 602 shows a shutter icon 604 as well as two timer options 606 and 608 for 3 and 10 seconds, respectively (see also FIG. 11, 1102). Display 602 can alternately use different icons, different number of timer options, etc. Upon selection of the desired countdown time, a display 610 will appear showing the preview screen along with a shutter icon 612. The shutter activation signal and countdown signal are sent to the electronic device (FIG. 11, 1104, 1105). In some embodiments, the timer option can be provided on the preview screen as indicated on display 611, which includes a single timer option 613 for a 3 second countdown. Using display 611, shutter icon 612 can be selected to capture an image without the countdown feature or timer icon 613 can be selected to capture an image using the countdown feature.

When the countdown feature is used and the timer approaches to within a few seconds (e.g., two seconds) of taking the picture (FIG. 11, 1106), a display 614 indicates this with a flashing icon 616 (FIG. 11, 1108, 1110). Alternately, icon 616 can enlarge and contract at varying speeds, change color, or make any other visual change. In addition, a unique timer sound will be generated. In one embodiment, a timer beeping sound is generated, with the frequency increasing as it gets close to the end of the countdown. In addition, the wearable mechanism can provide haptic feedback, such as a vibration, to the wrist of the user. The vibration can also vary in frequency as the end of the time-out period approaches.

Before the shutter of the electronic camera is activated, a display screen 618 which is blank can be displayed. This will prevent the appearance of the light of the display on the wrist of a user in a selfie or group shot in which the user appears. Alternately, a display 620 can be produced which shows a clock face or other decorative design on the display. Once the picture has been taken, the display returns to the preview mode shown in display 622, which includes a photo icon 624 for the photo just taken. Selecting icon 624 can pull up the photo or video for review, and also allow for review of previous photos and videos.

Selection of photo icon 624 can bring up the recently taken photo or video, and also the recent photos folder. Alternately, selection of the recent photo on the electronic device can bring up the same photo on the wearable mechanism. The selection of any stored photo or video by any means on the electronic device can bring it up on the wearable mechanism display as well.

FIG. 7 is a diagram illustrating a wearable mechanism device screen for an unsupported action according to an embodiment of the present invention. A screen 704 indicates that the device is not ready for any number of reasons. Also, a shutter icon 706 is displayed. Pressing shutter icon 706 will return to the home display with the carousel of selectable icons.

FIG. 8 is a diagram illustrating a wearable mechanism device screen for activating a timer according to an alternate embodiment of the present invention. A display screen 802 illustrates a preview mode with a timer icon 804. Thus, instead of tapping on the screen as in the previous embodiment to bring up the electronic timer screen, the user can select the timer icon. In one example, the timer icon is tapped while in another embodiment the timer icon may be pressed and slid to another position to activate the timer display 806. Display 806 is similar to display 602 in FIG. 6 as discussed above.

Additional control functions can be split between wearable mechanism and electronic device. For example, focusing can be done on either the electronic device or the wearable mechanism. On the wearable mechanism, the user can press a spot on the preview screen and hold it to set that spot as a point of focus. The wearable mechanism will identify the coordinates of the selected spot on the image, and transmit that information to the electronic device. Alternately, either touch, voice, or crown control inputs could be used for a variety of controls. For example, special effects can be selected, the exposure can be changed, photo versus video or other modes can be selected, choosing between front and back facing camera can be selected, or any other control can be selected or varied. Other potential controls on the wearable mechanism include a camera orientation, flash mode, HDR (High Dynamic Range) mode, video capture frame rate, camera mode (square, normal, video, slow motion video, etc), zoom and crop controls, aspect ratio selection, etc.

In one embodiment, the wearable mechanism communicates solely with the built in camera application on the electronic device. Alternately, an API can be made available for third party applications to be used by the wearable device to control the electronic device camera, such as Facebook and Instagram.

Upon the establishment of a communication link between the wearable mechanism and the electronic device, certain camera actions cause data and control signals to be sent from the electronic device to the wearable mechanism by the software on the electronic device. Such software can, for example, be an IOS (operating system) update which enables legacy smart phones to communicate with the wearable mechanism. Upon a shutter click, whether the control comes from the smart phone or the wearable mechanism, a copy of the photo or video is automatically sent to the wearable mechanism.

When a photo or video is sent to the wearable mechanism, it is first compressed using H264 or JPEG or any other compression protocol. The wearable mechanism decompresses the received photo or video.

Wearable Mechanism Block Diagram

Figure 9:
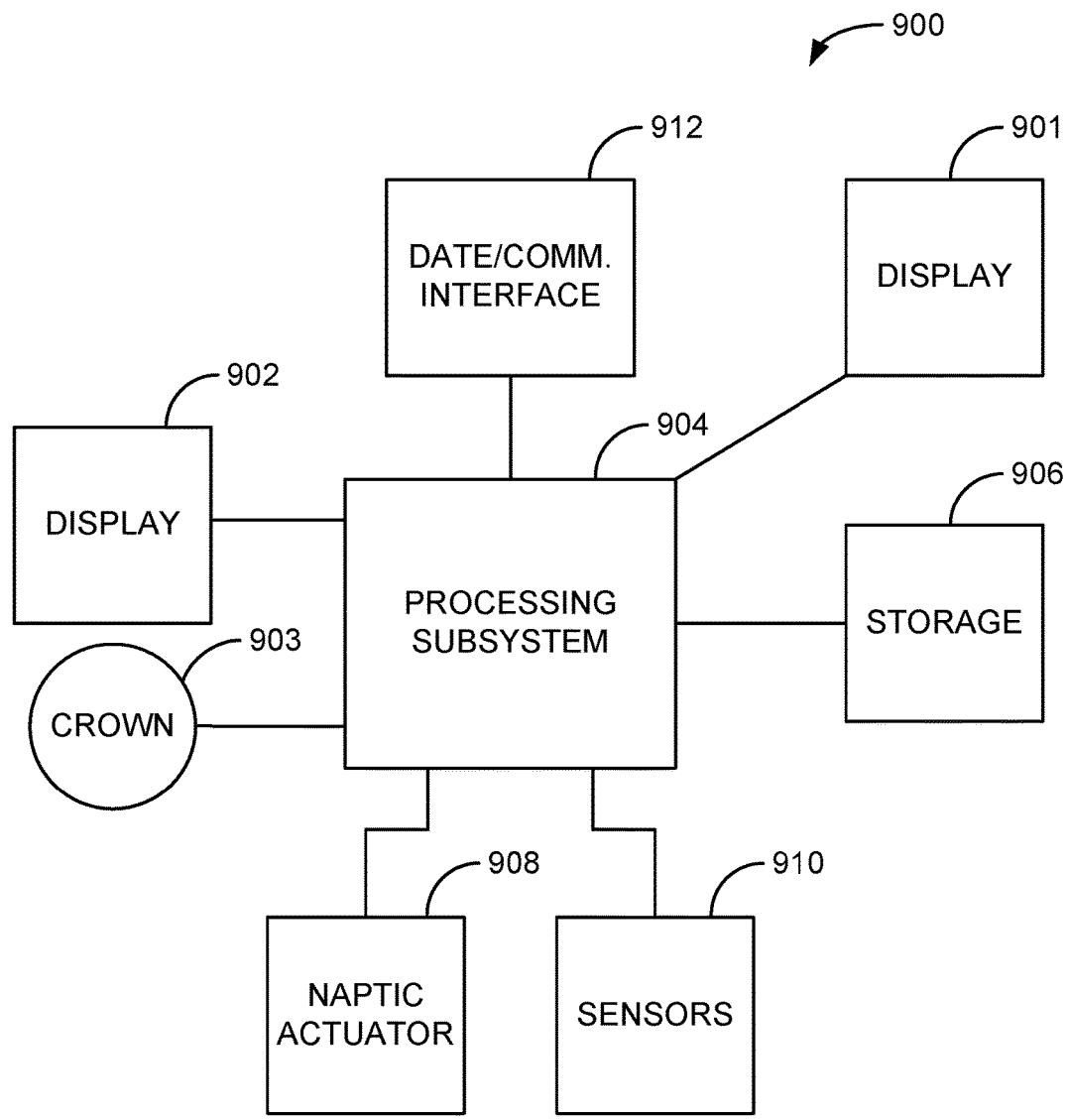
FIG. 9 is a block diagram of the hardware and associated software of a wearable mechanism device according to an embodiment of the present invention.

FIG. 9 is a block diagram showing components of a wearable mechanism device 900 according to an embodiment of the present invention. Device 900 can include a display 901, a touch input 902, a mechanical (crown) input 903, a processing subsystem 904, a storage subsystem 906, a haptic actuator 908, and a data and communication interface 912.

User touch input 902 can incorporate hardware and software components that facilitate user interaction with device 900. Such components can be of generally conventional or other designs. For example, in some embodiments, user touch input 902 can include a touch-screen interface that incorporates a display (e.g., LED-based, LCD-based, OLED-based, or the like) with a touch-sensitive overlay (e.g., capacitive or resistive) that can detect contact by a user's finger and/or other objects. By touching particular areas of the screen, the user can indicate actions to be taken, respond to visual prompts from the device, etc. In addition or instead, user touch input 902 can include audio components (e.g., speakers, microphone); buttons; knobs; dials; haptic input or output devices; and so on.

Processing subsystem 904, which can be implemented using one or more integrated circuits of generally conventional or other designs (e.g., a programmable microcontroller or microprocessor with one or more cores), can be the primary processing subsystem of device 900. Storage subsystem 906 can be implemented using memory circuits (e.g., DRAM, SRAM, ROM, flash memory, or the like) or other computer-readable storage media and can store program instructions for execution by processing subsystem 904 as well as data generated by or supplied to device 900 in the course of its operations, such as user-specific parameters. In operation, processing subsystem 904 can execute program instructions stored by storage subsystem 906 to control operation of device 900. For example, processing subsystem 904 can execute an operating system as well as various application programs specific to particular tasks (e.g., displaying the time, presenting information to the user, obtaining information from the user, communicating with a paired device, etc.). It is to be understood that processing subsystem 904 can execute any processing tasks desired.

A haptic actuator 908 is also shown. In various embodiments, haptic actuator 908 is activated by processing subsystem 904 to provide feedback to the user. In one embodiment, haptic actuator 908 outputs a force (e.g, a vibration) to provide a haptic sensation to a user. The actuator can include a piezo-electric actuator, a voice coil actuator, a pager motor, a solenoid, or other type of actuator.

Data and communication interface 912 can allow device 900 to communicate with other devices via wired and/or wireless communication channels. For example, data and communication interface 912 can include an RF transceiver and associated protocol stack implementing one or more wireless communication standards (e.g., Bluetooth standards; IEEE 802.11 family standards; cellular data network standards such as 3G, LTE; cellular voice standards, etc.). In addition or instead, data and communication interface 912 can include a wired communication interface such as a receptacle connector (e.g., supporting USB, UART, Ethernet, or other wired communication protocols). In some embodiments, data and communication interface 912 can allow device 900 to be paired with another personal electronic device of the user (also referred to as the "electronic" device), such as a mobile phone, laptop or desktop computer, tablet computer, or the like. Via data and communication interface 912, device 900 can provide commands and data to the electronic device.

It will be appreciated that device 900 is illustrative and that variations and modifications are possible. Embodiments of device 900 can include other components in addition to or instead of those shown. For example, device 900 can include a power source (e.g., a battery) and power distribution and/or power management components. Device 900 can sensors 910, such as a compass, a thermometer or other external temperature sensor, a Global Positioning System (GPS) receiver or the like to determine absolute location, camera to capture images, biometric sensors (e.g., blood pressure sensor, skin conductance sensor, skin temperature sensor), and so on.

Further, while device 900 described with reference to particular blocks, it is to be understood that these blocks are defined for convenience of description and are not intended to imply a particular physical arrangement of component parts. Further, the blocks need not correspond to physically distinct components, and the same physical components can be used to implement aspects of multiple blocks. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Communication Between Wearable Mechanism and Electronic Device

The communication of data from a device (e.g., electronic device 502) can occur through various protocols (e.g., 802.11 protocols, Bluetooth protocols, and near field communication (NFC) protocols). To determine which protocol to use, a device can include a link manager for determining which protocol to use for a particular application, and thus which driver path data should be sent. A lower level link layer can also perform selections of a particular protocol to use. Further, a user tunnel (UTUN) controller can coordinate a plurality of virtual connections with various client applications to communicate over a common socket connection with another device.

Figure 10:
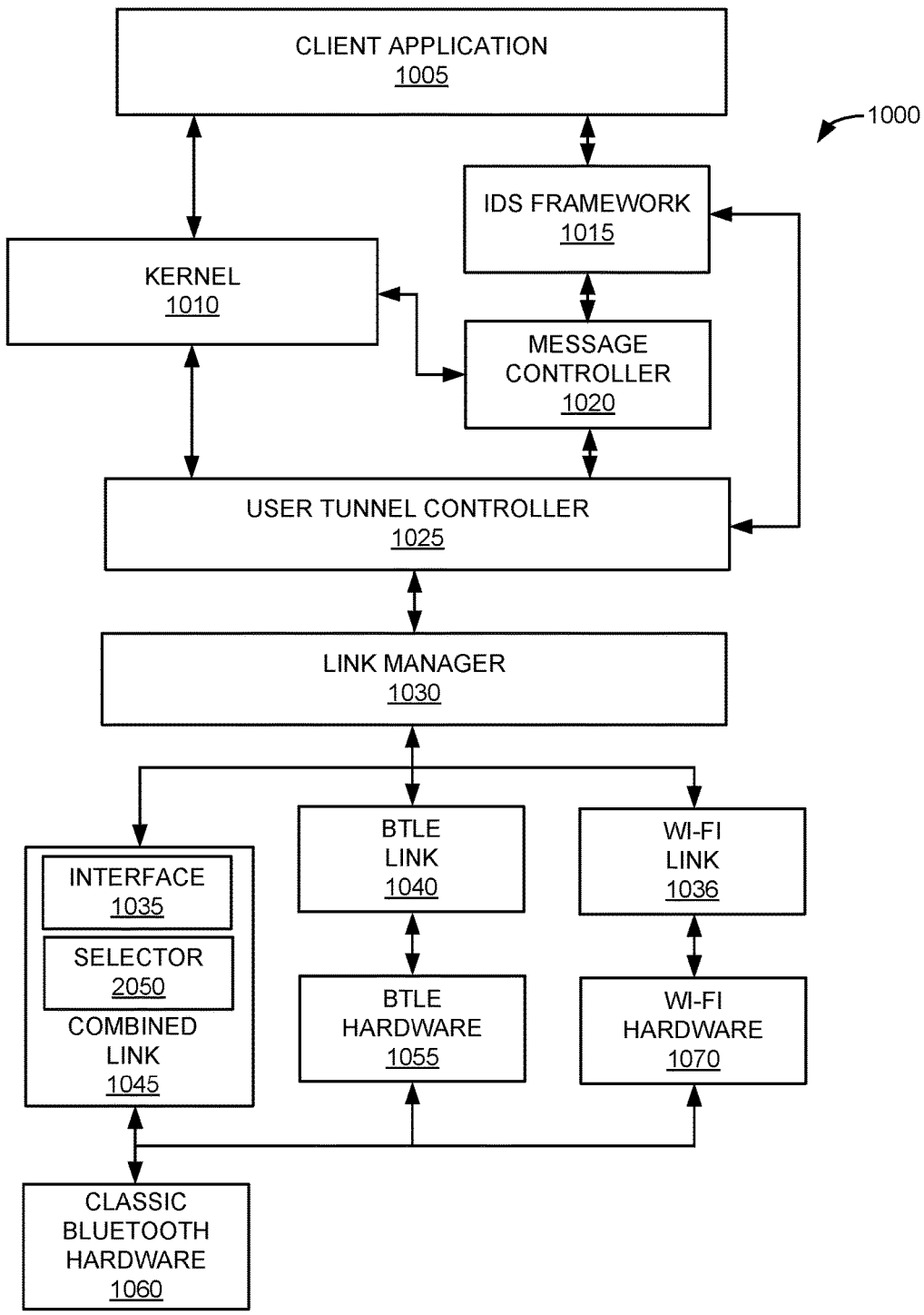
FIG. 10 is a diagram illustrating communication between a wearable mechanism device and a electronic device according to an embodiment of the present invention.

FIG. 10 shows a protocol stack 1000 for communicating data according to embodiments of the present invention. Various modules in protocol stack 1000 can be omitted, or other modules added. The software modules can be run on a same processor or different processors. Although only a few communication protocols are listed, numerous wireless protocols can be used. For example, Bluetooth protocols can include Basic Rate (BR), Enhanced Data Rate (EDR), and Low Energy (LE) options. Bluetooth BR/EDR is also referred to as Classic Bluetooth, and is used in one embodiment.

In some embodiments, a client application 1005 on the device (e.g., electronic device 502) can request data to be sent to another device (e.g., wearable mechanism device 506). The request can specify the other device via any suitable identifier, e.g., an account name, an IP address, a MAC address, etc. The request can be before or after the device determines that the other device is within communication, e.g., as determined by initial signaling, such as a handshake. The data (e.g., in a message or a stream) can be sent any suitable application layer protocol, such as HTTP, RTP, SMTP, MGCP, etc. The other device can be any device, including another device of the user. The request can made be in response to an action by the user, an internal event (e.g., based on time or other criteria) that may be in a same or other application (e.g., a calendar app), or an external event (e.g., in response to a message from another device). An example of an event is a syncing event.

Before sending data, client application 1005 can submit an open socket request (e.g., in a streaming example). The socket request can use information from an identity services (IDS) framework 1015, which can provide an address (or other type of ID) for the other device. For example, client application 1005 can know account information for the second device (e.g., account information of a different or same user), and IDS framework 1015 can store a list of device IDs for a particular account. IDS framework 1015 can be in communication external identity management infrastructure to obtain the list. Thus, IDS framework 1015 can store or otherwise obtain device IDs (e.g., addresses) for all devices that a user has registered with the identity management infrastructure. For example, IDS framework 1015 can request via an IDS daemon to identity management infrastructure to obtain the device IDs. In one implementation, the socket request can be made to kernel 1010.

In a messaging example, the request to send data can go to IDS framework 1015 to obtain a device ID, which can be sent to message a message controller 1020 and a user tunnel (UTUN) controller 1025. UTUN controller 1025 can establish a mapping between the device ID and an IP address (e.g., a virtual IP address) when the device ID is not an IP address. A socket can be created between message controller 1020 (which assigns a device ID to the socket) and kernel 1010 (which can assigns an address to the socket, such as a virtual IP address). UTUN controller 1020 can be used to create the socket connection between message controller 1020 and kernel 1010. In this manner, the send-date request from client application 1005 does not need to include a device ID, but can specify an account, which can then be cross-referenced by IDS framework 1015 with known devices of the account and their capabilities (e.g., if the request requires certain capabilities). Given that a device ID can be obtained, a pairing does not need to occur prior to creating the socket.

In various embodiments, IDS framework 1015 can receive a particular port/service at the other device from client application 1005, determine the port/service based on information obtained from identity management infrastructure, or determine the port/service from a token sent in the request. IDS framework 1015 can then communicate a device ID and other header information to message controller 1020 and/or UTUN controller 1025. IDS framework 1015 and UTUN controller 1025 can communicate via cross process communication (XPC). UTUN controller 1025 can be part of an IDS daemon, and can receive a device ID from identity management infrastructure.

As mentioned above, UTUN controller 1025 can create a virtual address that corresponds to the actual device address, where the virtual address can be used to create a virtual socket. A virtual socket can also be created using any device ID (e.g., an actual address of a device or other ID). As an example, a socket can be created for communication between client application 1005 and kernel 1010 (e.g., in a streaming context), where kernel 1010 can have various sockets open with various client applications. Kernel 1010 can have a single connection to UTUN controller 1025 for the other device and multiplex (mux) the data from various client applications into the single connection. Instead or in addition, UTUN controller 1025 can also perform the muxing, e.g., if multiple sockets exist between the kernel 1010 and UTUN controller 1025 for various client applications to the other device. Incoming data can be demultiplexed (de-muxed) for sending to the destination client application.

As another example, a socket can be created between kernel 1010 and message controller 1020 (e.g., in a messaging context), where a socket can be created for each destination device, with different sockets to a same device potentially having different priorities. Thus, a particular virtual socket can be associated with a particular device and a particular priority (e.g., high and low). Message controller 1020 can have various connections to various client applications. Thus, message controller 1020 can provide mux/demux capabilities.

UTUN controller can create a primary socket with the other device. When UTUN controller 1025 receives data using a virtual connection associated with the second device, it can then map the virtual connection to the primary socket for communicating with the other device. All data for the other device can then be sent out through the primary socket. The virtual address for a virtual socket can be passed back to client application 1015, e.g., in the stream context. In one embodiment, a virtual socket involving kernel 1010 is a TCP socket. The virtual address can have a same format as a regular address, e.g., an IPv6 address. A mux module can include any combination of kernel 1010, message controller 1020, and UTUN controller 1025.

When client application 1005 sends data, client application 1005 can use the virtual socket to send data to kernel 1010. For example, the data can be sent using TCP via the virtual socket. Kernel 1010 can implement an UTUN interface for communicating with UTUN controller 1025. Kernel 1010 would pass the data (e.g., with a TCP header) and the virtual socket identifying the virtual address to UTUN controller 1025, which would then use the virtual address to resolve the device address for determining the device socket.

When sending to the data over the device socket, a link manager 1030 can determine which link to use. A link can be a particular combination of a wireless interface protocol (e.g., Bluetooth or Wi-Fi), a transport protocol (e.g., TCP, UDP, etc.), and a destination device. In this manner, UTUN controller 1025 does not need to know how the data is being sent, but instead can simply send the data to link manager 1030.

In various embodiments, the determination by link manager 1030 can be made per data packet, per set of data packets, per device socket, and may change from one data packet to another. Link manager 1030 may then select a link for sending the data. In the example shown, a Wi-Fi link 1035 provides software drivers for communicating with one or more Wi-Fi protocols, and BLTE link 1040 provides software drivers for communicating with Bluetooth LE. Wi-Fi link 1035 is in communication with Wi-Fi hardware 1070, and BLTE link 1040 is in communication with BLTE hardware 1065. Wi-Fi link 1035 can be used for various Wi-Fi protocols, such as infra-WiFi (infrastructure WiFi). In one embodiment, link manager 1030 can try all links to determine whether any of the links can contact the other device, and then use a connected link with a highest predetermined rank or dynamic rank.

Hardware 1065-1070 can be in communication with links assigned to various devices. For example, links 1035, 1040, and 1045 can be assigned for communication with a second device. In addition, other links that are assigned for communication with a third device can also be in communication with hardware 1065-1070. When a particular hardware receives data, software can identify a particular sending device and then determine the corresponding link, e.g., using header information to determine the link corresponding to the sending device and transport protocol.

In some embodiments, a combined link 1045 can include an interface 1055 for communicating with link manager 1030 and a selector 1050 that selects a particular protocol to use. The protocols can be the same or different from that available to link manager 1030. Selector 1050 can perform similar functions as link manager 1030 in that a particular link is selected. However, link manager 1030 and selector 1050 can use different criteria for determining which link to use. For example, link manager 1030 can determine to use combined link 1045, and selector 1050 can then determine that BLTE hardware 1065 is to be used. The hardware can be contained on same or separate chips.

One or more protocols can be only available via combined link 1045, such as classic Bluetooth hardware 1050. Link manager 1030 and selector 1050 can use various criteria for determining which link to use, such as power usage of a link, speed of a link (e.g., real-time data rate), and signal strength of a link. A goal of the optimization for selecting a link can be to provide a minimal data rate at a lowest possible energy.

Other Elements

One or more processors in processing subsystem 904 run various software components stored in medium storage 906 to perform various functions for the wearable mechanism device. In some embodiments, the software components include an operating system, communication module (or set of instructions), and other applications (or set of instructions). The operating system can be any suitable operating system, including iOS, Mac OS, Darwin, RTXC, LINUX, UNIX, OS X, WINDOWS, or an embedded operating system such as VxWorks. The operating system can include various procedures, sets of instructions, software components, and/or drivers for controlling and managing general system tasks (e.g., memory management, storage device control, power management, etc.) and facilitates communication between various hardware and software components.

Communication module 912 facilitates communication with other devices over one or more external ports or via wireless circuitry and includes various software components for handling data received from wireless circuitry and/or external ports.

The wearable mechanism can include one or more applications, including without limitation, a browser, address book, contact list, email, instant messaging, social networking, word processing, keyboard emulation, widgets, JAVA-enabled applications, encryption, digital rights management, voice recognition, voice replication, a music player (which plays back recorded music stored in one or more files, such as MP3 or AAC files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations, and the like) on a display surface. In another example, a timer module can be a software timer. The timer module can also be implemented in hardware. The time module can maintain various timers for any number of events.

An I/O subsystem can be coupled to the display system, which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, an I/O subsystem can include a display and user input devices such as a keyboard, mouse, and/or trackpad. In some embodiments, the I/O subsystem can include a touch-sensitive display. A touch-sensitive display can also accept input from the user based on haptic and/or tactile contact. In some embodiments, a touch-sensitive display forms a touch-sensitive surface that accepts user input. The touch-sensitive display/surface (along with any associated modules and/or sets of instructions in storage 906) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, the I/O subsystem can be coupled to one or more other physical control devices (not shown), such as push-buttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, the wearable mechanism device can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

The foregoing description may make reference to specific examples of an wearable mechanism device (e.g., a wrist-worn device) and/or a electronic device (e.g., a smart phone). It is to be understood that these examples are illustrative and not limiting; other devices can be substituted and can implement similar functional blocks and/or algorithms to perform operations described herein and/or other operations.

Embodiments of the present invention, e.g., in methods, apparatus, computer-readable media and the like, can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Alternate controls can be used in embodiments of the invention. Instead of a crown input, the wearable mechanism could have a bezel which is rotated, or a push-button, or any other type of mechanical input. Thus, although the invention has been described with respect to specific embodiments, it will be appreciated that the invention is intended to cover all modifications and equivalents within the scope of the following claims.

What is claimed is:

1. A method comprising:
establishing a wireless connection between a wearable mechanism device and a camera in an electronic device;
providing, on a display screen of the wearable mechanism device, a first display in which a control interface for controlling the camera is provided along with a preview of an image viewed by the camera;
receiving, at the wearable mechanism device, a user input to capture an image with the camera;
thereafter, (i) changing the first display to a second display in which the preview of the image viewed by the camera is not shown on the display screen and (ii) providing, from the wearable mechanism device, an image capture signal to the camera in the electronic device; and
thereafter, changing the second display on the display screen to a third display that enables a user to view the image captured by the camera in response to the user input.

2. The method of claim 1 wherein the second display is a substantially blank screen.

3. The method of claim 1 wherein the second display is an image of a watch face.

4. The method of claim 1 wherein the user input to capture an image with the camera generates a timed shutter activation signal that instructs the camera to capture an image after a countdown period and wherein the method further comprises, prior to changing the first display to the second display, providing a user feedback signal when a countdown time reaches a predetermined value.

5. The method of claim 4 wherein said user feedback signal comprises at least one of: an audible sound, a visual effect, and a haptic effect.

6. The method of claim 1 wherein the control interface includes a shutter control icon that, when selected by a user, generates a user input to capture an image from the camera.

7. The method of claim 6 wherein the control interface further includes a timed shutter activation icon that, when selected by a user, generates a user input to capture an image from the camera after a predetermined countdown period.

8. An electronic wearable mechanism device comprising:
a housing;
a wireless communication interface operable to communicate with an electronic device having a camera;
a storage system to store image data transmitted from the camera;
a display screen;
a control interface to control the camera in the electronic device, the control interface including
a shutter control for the camera shutter in the electronic device;
a timer control for the camera to provide a countdown time before an image capture event; and
a processor system programmed to:
monitor said countdown time;
establish a wireless connection between the wearable electronic device and the camera;
provide a first display on the display screen in which a preview of an image viewed by the camera is shown on the display screen;
receive, at the wearable electronic device, a user input to generate a shutter activation signal that instructs the camera to capture an image;
change the first display on the display screen to a second display in which the preview of the image viewed by the camera is not shown on the display screen; and
thereafter, change the second display on the display screen to a third display that enables a user to view the image captured by the camera in response to the shutter activation signal.

9. The wearable electronic mechanism device of claim 8 wherein the second display is a substantially blank screen.

10. The wearable electronic mechanism of claim 8 wherein the first display further includes a shutter control icon that, when selected, generates a shutter activation signal that instructs the camera to capture an image.

11. The wearable electronic mechanism of claim 10 wherein the first display further includes a timed shutter activation icon that, when selected, generates a shutter activation signal that instructs the camera to capture an image after a countdown period.

12. The wearable electronic mechanism of claim 11 wherein the second display is a blank screen.

13. The wearable electronic mechanism of claim 8 wherein the third display includes a user-selectable icon that, upon being selected, displays the image captured by the camera on the display screen.

14. A method of controlling a camera with a wearable electronic device that includes a display screen, the method comprising:
establishing a wireless connection between the wearable electronic device and the camera;
providing a first display in which a preview of an image viewed by the camera is shown on the display screen;
receiving, at the wearable electronic device, a user input to generate a shutter activation signal that instructs the camera to capture an image;
changing the first display on the display screen to a second display in which the preview of the image viewed by the camera is not shown on the display screen; and
thereafter, changing the second display on the display screen to a third display that enables a user to view the image captured by the camera in response to the shutter activation signal.

15. The method of claim 14 wherein the first display further includes a shutter control icon that, when selected, generates a shutter activation signal that instructs the camera to capture an image.

16. The method of claim 14 wherein the first display further includes a timed shutter activation icon that, when selected, generates a shutter activation signal that instructs the camera to capture an image after a countdown period.

17. The method of claim 15 wherein the first display further includes a shutter control icon and a timed shutter activation icon, wherein the shutter control icon, when selected, generates a shutter activation signal that instructs the camera to capture an image and the shutter activation icon, when selected, generates a shutter activation signal that instructs the camera to capture an image after a countdown period.

18. The method of claim 14 wherein the second display is a blank screen.

19. The method of claim 14 wherein the third display includes a user-selectable icon that, upon being selected, displays the image captured by the camera on the display screen.

20. The method of claim 19 wherein the third display further includes a preview of an image viewed by the camera and the user-selectable icon is superimposed over the preview image.

21. The method of claim 14 wherein, prior to changing the first display to the second display, a user-feedback signal is generated by the wearable electronic device a predetermined amount of time prior to the camera capturing the image.

\* \* \* \* \*